W. F. KRIEGER.
REFRIGERATING APPARATUS.
APPLICATION FILED OCT. 29, 1917.

1,299,961.

Patented Apr. 8, 1919.
2 SHEETS—SHEET 1.

W. F. Krieger INVENTOR

BY

W. H. Lieber ATTORNEY

W. F. KRIEGER.
REFRIGERATING APPARATUS.
APPLICATION FILED OCT. 29, 1917.

1,299,961.

Patented Apr. 8, 1919.
2 SHEETS—SHEET 2.

W. F. Krieger INVENTOR

BY

W. H. Lieber ATTORNEY

UNITED STATES PATENT OFFICE.

WALTER F. KRIEGER, OF MILWAUKEE, WISCONSIN.

REFRIGERATING APPARATUS.

1,299,961.  Specification of Letters Patent.  Patented Apr. 8, 1919.

Application filed October 29, 1917. Serial No. 198,916.

*To all whom it may concern:*

Be it known that I, WALTER F. KRIEGER, a citizen of the United States, residing at Milwaukee, in the county of Milwaukee and State of Wisconsin, have invented a certain new and useful Improvement in Refrigerating Apparatus, of which the following is a specification.

This invention relates to improvements in the construction and operation of refrigerating apparatus, and has particular relation to an improved automatic regulating device for controlling refrigerating systems of the type in which a fluid such as ammonia or the like, is employed as a refrigerating agent.

An object of the invention is to provide a refrigerating system regulating device, which is simple in construction and efficient in operation. Another object is to provide a sensitive feed valve controlling device which is positive and automatic in operation.

A more specific object of the invention is to provide means for automatically regulating the admission of refrigerant to a cooling device, in accordance with variations in a characteristic of the refrigerating medium in the device. It is common practice in the art of refrigerating, to control the admission of refrigerating fluid to the cooling device, either manually by means of hand actuated valves, or automatically by means of valve devices actuated in accordance with variations in temperature or pressure of the refrigerating medium in the cooling device. The present invention contemplates an automatic control which may be effected independently of the temperature and of the pressure of the refrigerant, but which is primarily dependent upon the amount of moisture in or the humidity of the cooling medium. While the term "humidity" is ordinarily employed to define a condition of the atmosphere, it is employed in the present specification and in the claims, as meaning the amount of liquid vapor or moisture in the gasified refrigerant. This characteristic of the gas may vary under different conditions of temperature and pressure, from a condition of no moisture which compares favorably with the condition of super-heated steam, to a condition of complete saturation. As ammonia is the refrigerant ordinarily employed, this fluid will be referred to in the present specification by way of illustration, but it is not intended to limit the scope of the invention by such specific reference.

A clear conception of an embodiment of the invention may be had by referring to the drawings accompanying and forming a part of this specification, in which like reference characters designate the same or similar parts in the various views.

Figure 1:
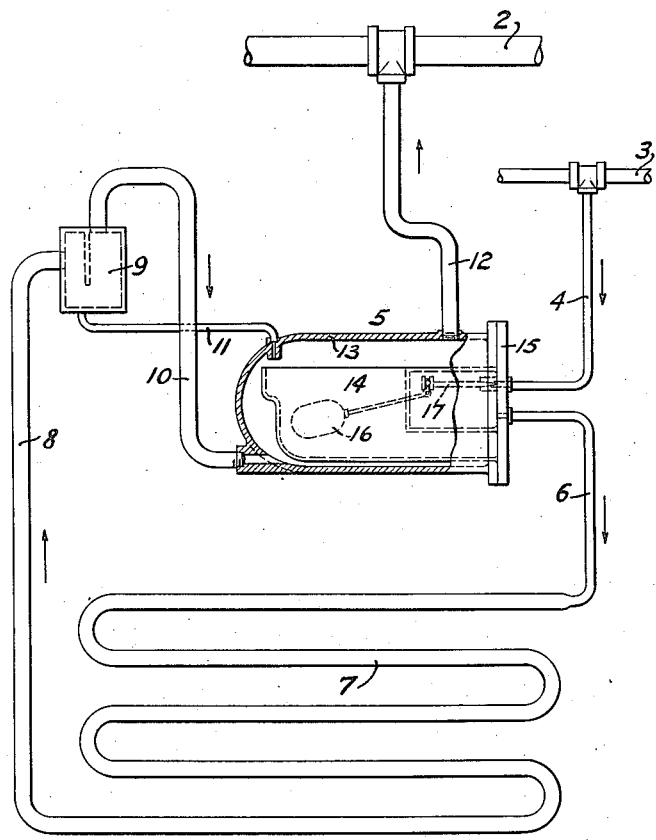
Figure 1 is a diagrammatic part-sectional plan view of one unit of a multiple unit refrigerating system.
Figure 3:
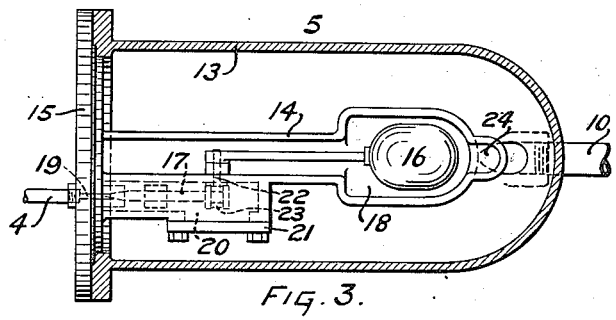
Fig. 3 is an enlarged part-sectional top view of the improved refrigerant regulating device.
Figure 4:
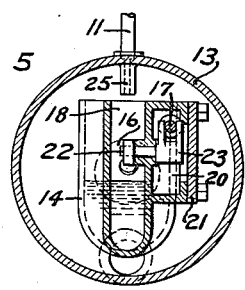
Fig. 4 is an enlarged transverse vertical sectional view of the refrigerant regulating device, the section being taken along the line IV—IV of Fig. 2, looking in the direction of the arrow.
Figure 2:
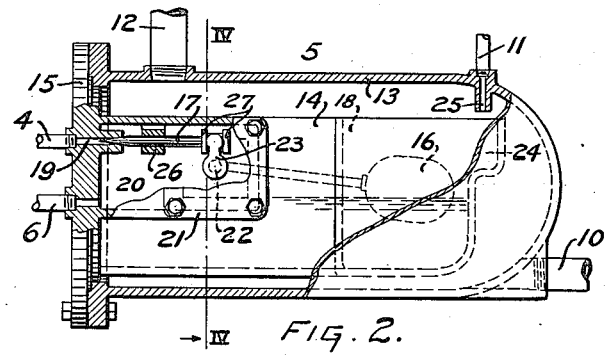
Fig. 2 is an enlarged part-sectional side elevation of an improved refrigerant regulating device.
Figure 5:
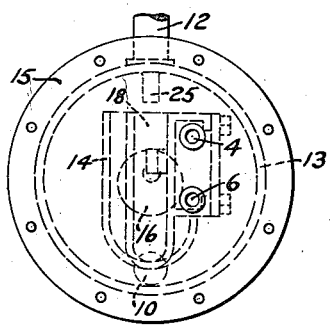
Fig. 5 is an enlarged end elevation of the improved refrigerant regulating device.

The multi-unit direct expansion refrigerating system to which the invention is disclosed as applied, comprises a refrigerant or ammonia supply main 3, a discharge or return main 2, and one or more cooling devices or coils 7 ordinarily connected in parallel to said mains 3, 2 and each having a regulating device or feed valve 5. The ammonia feed pipe 4 connects the supply main 3 with a valve controlled orifice 19 in the end head 15 of the regulating device 5. The feed pipe 6 connects the regulating device 5 with the cooling device or coil 7. The discharge end 8 of the cooling coil 7 communicates with a liquid separator 9 of any suitable construction, which communicates with the lower rear portion of the outer casing 13, of the regulating device 5, through a pipe 10. The upper forward portion of the casing 13 is connected to the return main 2 by means of a return pipe 12. A liquid drain 11 connects the separator 9 with an orifice 25 in the upper portion of the casing 13. While the invention has special utility when applied to a multi-unit system, it is not limited to such application.

The regulating device or feed valve 5 comprises an outer casing 13 and a front head 15 forming a closure for the forward end of the casing 13 and having a secondary casing 14 formed integral therewith. The casing 14 forms a liquid basin 18 extending longitudinally within the casing 13 and communicating upwardly with the interior of the outer casing 13. The secondary casing 14 also forms a closed chamber 20 which normally does not communicate with the interior of the main casing 13, but the interior of which is readily accessible upon removal of a cover plate 21.

Within the chamber 20 is a needle valve 17 which is guided in a bearing 26 and controls the orifice 19 in the end head 15. The needle valve 17 is provided adjacent to its end, with a pair of spaced collars or flanges 27 which are adapted for engagement with the end of a bifurcated crank arm 23 secured to a short pivot cross-shaft 22. The cross-shaft 22 penetrates the wall of the chamber 20 and extends into the basin 18. A float 16 which rides upon the liquid in the basin 18 or in the absence of liquid rests upon the basin bottom, has its stem secured to an end of the cross-shaft 22. The casing 14 is also provided at its rear end with a drip-catch 24 located directly below the liquid return orifice 25 of the casing 13.

During the normal operation of the system, and assuming the apparatus to be in such a condition that there is no liquid in the basin 18, the valve 17 is wide open and liquid ammonia is supplied from the main 3, through the pipe 4 and orifice 19, past the valve 17, through the chamber 20 and pipe 6, to the cooling device or coil 7. The inflow of liquid ammonia continues until the inner upper surface of the coil 7 is covered with a liquid film and there is a substantial accumulation of liquid at the lower portion of the coil 7, the remainder of this coil being filled with gas. With the apparatus in this condition some of the liquid and gas is withdrawn from the coil 7 through the discharge end 8 thereof and is delivered into the separator 9, by virtue of the reduced pressure in the return pipe 2. In the separator 9, the liquid ammonia is separated from the gas, the former passing through the drain pipe 11 and orifice 25 into the basin 18, and the latter flowing through the pipe 10, casing 13 and pipe 12 into the return main 2. As the level of the liquid ammonia in the basin 18 rises, the float 16 gradually rises and acts through the cross-shaft 22, crank arm 23 and valve flanges 27, to move the needle valve 17 toward its seat, thereby diminishing the supply of refrigerant admitted to the coil 7. When the supply of refrigerant has been thus regulated, cooling is effected by evaporation of liquid ammonia in the cooling coil 7. As this evaporation continues, the gases escaping from the coil 7 through the separator 9, pipe 10, casing 13 and pipe 12, gradually become drier and warmer until their humidity and temperature reaches such a point, that the gases in passing along the walls of the basin 18 and over the liquid ammonia therein, will absorb and evaporate some of this liquid, thus causing the liquid level to drop. As the liquid level in the basin 18 drops, the float 16 gradually moves downwardly and causes the needle valve 17 to open wider, thereby increasing the supply of liquid ammonia admitted to the coil 7. As soon as the supply has been sufficiently replenished, the exhaust gases will no longer absorb liquid from the basin 18, thereby stopping the evaporation of liquid ammonia from the basin 18, preventing further opening movement of the needle valve 17, and in this manner effectively controlling the quantity of liquid ammonia admitted to the cooling coil 7.

It will thus be noted that a sensitive automatic control is effected, which is responsive to variations in the moisture content of the refrigerating medium. The valve 17 will automatically assume a position during normal operation, wherein the inner surface of the cooling coil remains coated with a liquid film, the supply and discharge of refrigerant to and from the coil 7, being balanced and a predetermined cooling condition being thus maintained in the coil. If the conditions in or adjacent the coil 7 vary, the position of the valve 17 will be automatically adjusted to accommodate such variations in cooling conditions. It will be noted however, that the position of the feed valve 17 may also be affected by variations in conditions in the supply and discharge mains 3, 2. This is especially true in systems of either the single or multiple unit type, wherein the pressure in the supply and discharge mains 3, 2 is subject to variation due to changes in manner of operation of the compressor. It is also true in multiple unit systems wherein the conditions in the supply and discharge mains 3, 2 are subject to variations due to independent manipulation of the various units. Each valve 17 will however, under any of these and other conditions, effect perfect regulation of the supply to the unit controlled thereby, irrespective of the operating conditions in other portions of the system.

While various details of the apparatus have been shown more or less diagrammatically in order to simplify the disclosure, it is not intended to limit the scope of the claims by such disclosure. The separator 9 may be of any of the well known forms, and suitable cut-out and manual control valves should be provided wherever necessary or desirable. All parts of the apparatus are readily accessible for inspection and repairs, and are preferably of simplest construction in order to insure efficient operation.

It should be understood that it is not desired to limit the invention to the exact details of construction herein shown and described for various modifications may occur to a person skilled in the art.

It is claimed and desired to secure by Letters Patent:—

1. In combination, a source of refrigerant supply, a cooling device communicable with said source, and means for effecting delivery of refrigerant from said source to said device in accordance with variations in the humidity of refrigerant in said device.

2. In combination, a source of refrigerant supply, a cooling device communicable with said source, and means for effecting delivery of refrigerant from said source to said device in accordance with variations in the moisture content of the refrigerant leaving said device.

3. In combination, a source of refrigerant supply, a cooling device communicable with said source, a valve for controlling the flow of refrigerant from said source to said device, and means for adjusting said valve in accordance with variations in the moisture content of the refrigerant in said device.

4. In combination, a refrigerant supply source, a cooling device, a valve for controlling the flow of refrigerant from said source to said device, and means for adjusting said valve in accordance with variations in the moisture content of the refrigerant leaving said cooling device.

5. In combination, a refrigerant supply source, a cooling device, a valve for controlling the flow of refrigerant from said source to said device, means affording a bath of liquid refrigerant isolated from said valve, means for varying the position of said valve in accordance with variations in level of the liquid in said bath, and means of communication between said bath and said cooling device.

6. In combination, a cooling device, valve means for controlling the admission of refrigerant to said device, a refrigerant containing basin isolated from said valve means, means for adjusting said valve means in accordance with variations in the quantity of refrigerant in said basin, and means for conducting refrigerant in proximity to said basin to vary the quantity of refrigerant admitted to said cooling device in accordance with variations in the moisture content of refrigerant leaving said device.

7. In combination, a cooling device, a valve for controlling the admission of refrigerant to said device, a liquid containing basin isolated from said valve, means for adjusting said valve in accordance with variations in level of the liquid in said basin, and means for conducting gaseous refrigerant in proximity to said liquid to vary said liquid level in accordance with variations in the humidity of refrigerant leaving said device.

8. In combination, a cooling device, a valve for controlling the admission of refrigerant to said device, a liquid refrigerant containing basin isolated from said valve, means for adjusting said valve in accordance with variations in level of the liquid refrigerant in said basin, and means for conducting the refrigerant leaving said device in proximity to the liquid in said basin.

9. In combination, a cooling device, a valve for controlling the flow of refrigerant to said device, a liquid refrigerant containing basin isolated from said valve, a float for adjusting said valve in accordance with variations in level of the liquid refrigerant in said basin, and means for conducting the refrigerant leaving said device in proximity to the liquid in said basin.

10. In combination, a cooling device, a valve for controlling the flow of refrigerant to said device, a liquid refrigerant containing basin isolated from said valve, a float for adjusting said valve in accordance with variations in level of the liquid refrigerant in said basin, means for separating the liquid and gaseous refrigerant leaving said device, and means for conducting said gaseous refrigerant in proximity to the liquid in said basin.

11. In combination, a cooling device, a valve for controlling the flow of refrigerant to said device, a liquid refrigerant containing basin isolated from said valve, a float for adjusting said valve in accordance with variations in level of the liquid refrigerant in said basin, means for separating the liquid and gaseous refrigerant leaving said device, means for conducting said liquid refrigerant into said basin, and means for conducting said gaseous refrigerant in contact with the walls of and the liquid in said basin.

12. In combination, a cooling device, a valve for controlling the flow of refrigerant to said device, a liquid refrigerant containing basin, a float for adjusting said valve in accordance with variations in level of the liquid refrigerant in said basin, means forming a chamber surrounding said basin, means for separating the liquid and gaseous constituents of the refrigerant leaving said device, means for conducting said liquid constituent into said basin, and means for conducting said gaseous constituent through said chamber.

13. In combination, a cooling coil, a valve for regulating the flow of refrigerant to said coil, a liquid refrigerant basin, a float for adjusting said valve in accordance with variations in level of the liquid refrigerant in said basin, means forming a chamber surrounding said basin, a separator for the liquid and gaseous constituents of the refrigerant leaving said coil, means for conducting said gaseous constituents into said chamber, and means for exhausting said gaseous constituents from said chamber.

14. In combination, a source of refrigerant supply, a cooling coil communicable with said source, and means for effecting delivery of refrigerant from said source to said coil in accordance with variations in the moisture content of the refrigerant delivered from the end of said coil.

In testimony whereof, the signature of the inventor is affixed hereto.

WALTER F. KRIEGER.